United States Patent [19]

Gagliano et al.

[11] Patent Number: 5,269,254
[45] Date of Patent: Dec. 14, 1993

[54] METHOD AND APPARATUS FOR GROWING OYSTER REEF

[76] Inventors: Sherwood M. Gagliano; Mark H. Gagliano, both of 929 E. Lakes View Dr., Baton Rouge, La. 70810

[21] Appl. No.: 908,469

[22] Filed: Jul. 6, 1992

[51] Int. Cl.$^5$ .............................................. A01K 61/00
[52] U.S. Cl. ................................. 119/237; 119/236; 405/29; 405/32
[58] Field of Search .................. 119/4, 3, 2; 405/21-23, 25-35

[56] References Cited

U.S. PATENT DOCUMENTS

| | | | |
|---|---|---|---|
| 1,146,229 | 7/1915 | Adamson | 405/32 |
| 2,319,170 | 5/1943 | Toner | 119/4 |
| 3,294,061 | 12/1966 | Hanks | 119/4 |
| 3,316,881 | 12/1965 | Fischer | 119/4 |
| 3,430,607 | 3/1969 | Darouen | 119/4 |
| 3,702,599 | 11/1972 | Erolzer | 119/4 |
| 3,779,209 | 12/1973 | Budge et al. | 119/4 |
| 3,811,411 | 5/1974 | Moeller | 119/4 |
| 3,985,101 | 10/1976 | Thompson | 119/4 |
| 4,170,197 | 10/1979 | Walker | 119/4 |
| 4,182,270 | 1/1980 | Fourcher | 119/4 |
| 4,186,687 | 2/1980 | Gilpatric | 119/4 |
| 4,317,429 | 3/1982 | Leighton et al. | 119/2 |
| 4,377,987 | 3/1983 | Satre | 119/4 |
| 4,710,057 | 12/1987 | Laier | 405/32 |
| 4,788,937 | 12/1988 | Keyser | 119/4 |
| 4,947,791 | 8/1990 | Laier et al. | 119/3 |

FOREIGN PATENT DOCUMENTS

| | | | |
|---|---|---|---|
| 707627 | 5/1928 | Australia | 119/4 |
| 2407665 | 7/1979 | France | 119/4 |
| 2513851 | 4/1983 | France | 119/4 |
| 1041082 | 9/1983 | U.S.S.R. | 119/4 |
| 1069743 | 1/1984 | U.S.S.R. | 119/3 |

*Primary Examiner*—Gene Mancene
*Assistant Examiner*—Todd E. Manahan
*Attorney, Agent, or Firm*—David L. Ray

[57] ABSTRACT

A method for forming an oyster reef, includes setting seed oysters on cultch material, placing the cultch material containing the seed oysters in water permeable panels to form a vertical permeable wall of cultch material through which water may flow, and placing the panels in water having favorable conditions for oyster growth. The apparatus includes water permeable panels for holding cultch material in a vertical permeable wall to expose the entire column or wall of cultch to water having favorable conditions for oyster growth, and blocks formed from the panels.

17 Claims, 6 Drawing Sheets

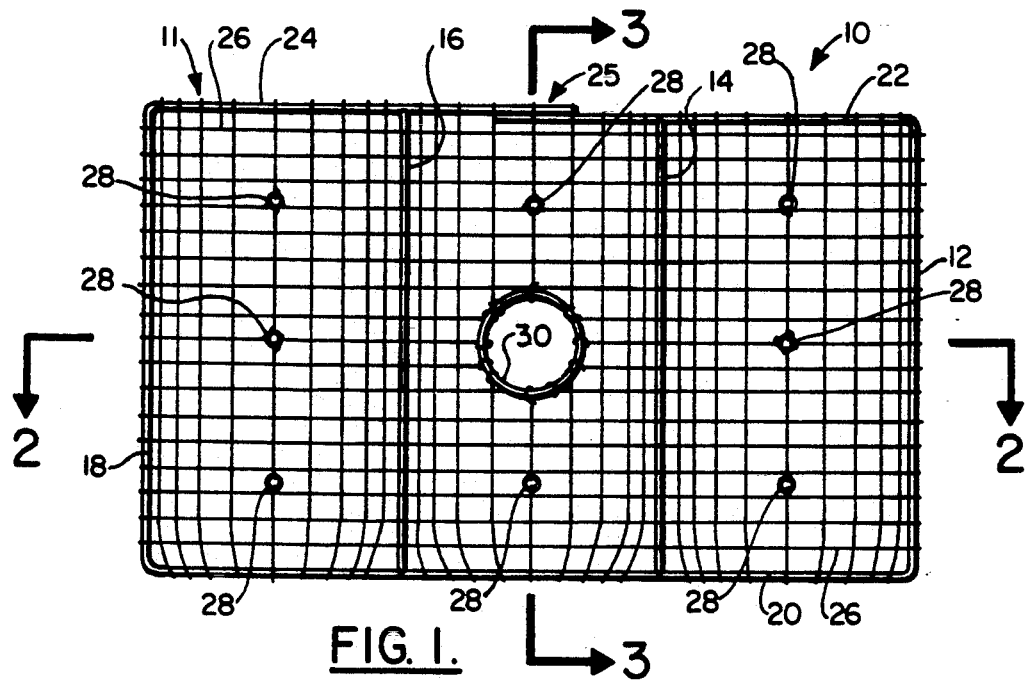
FIG. 1.
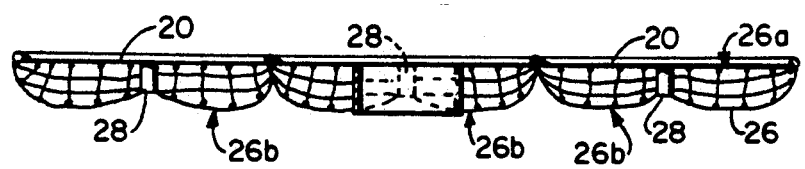
FIG. 2.
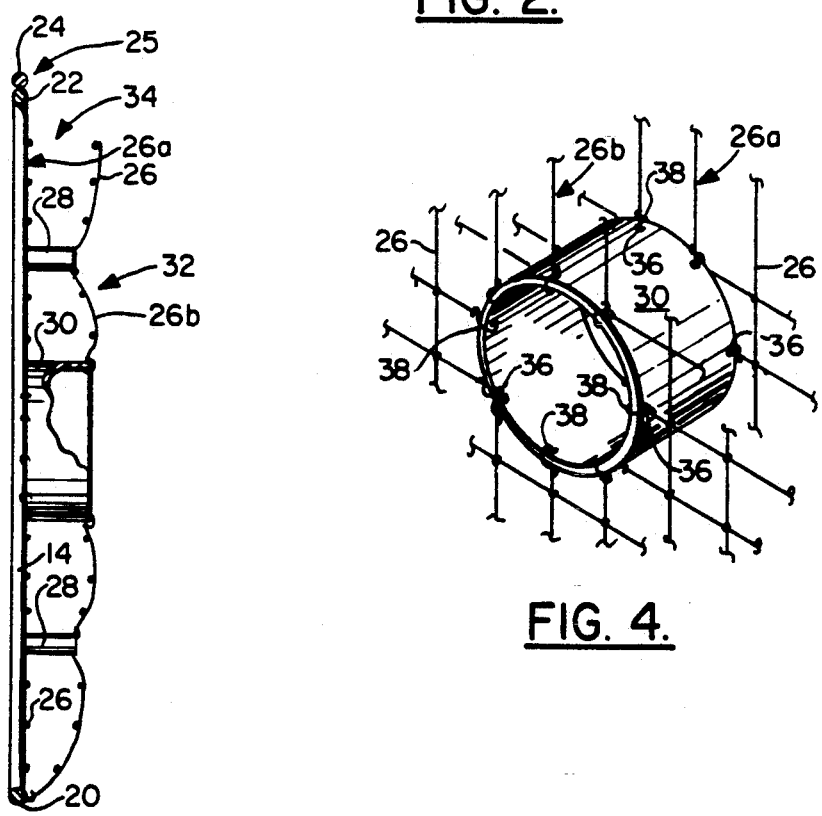
FIG. 3.
FIG. 4.

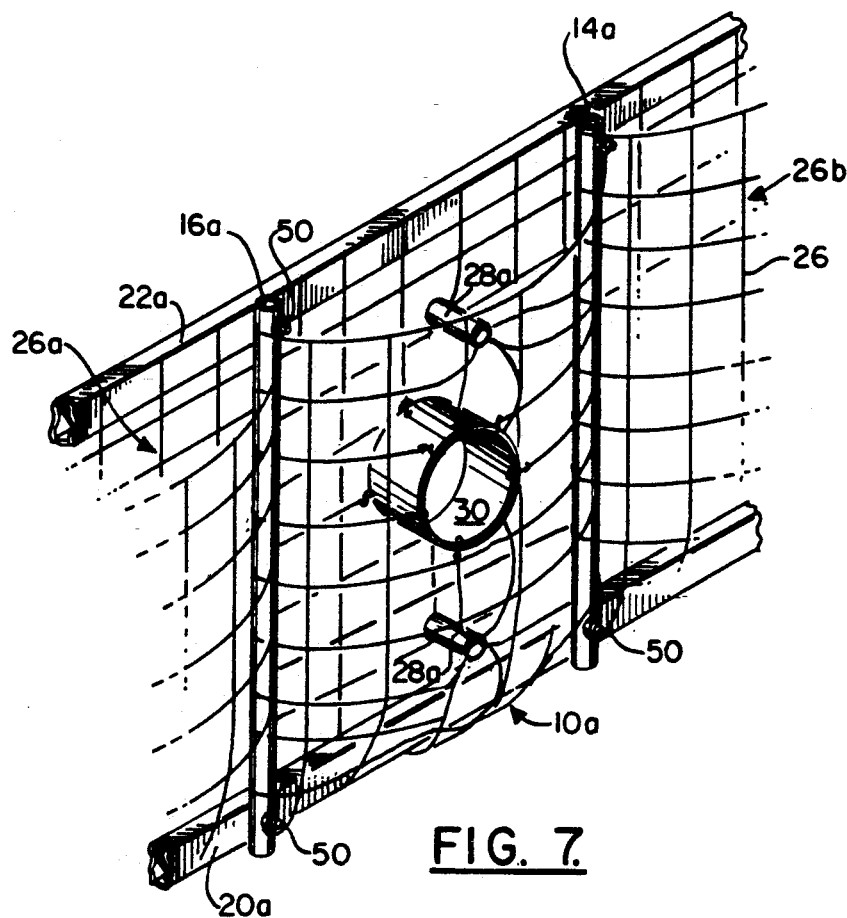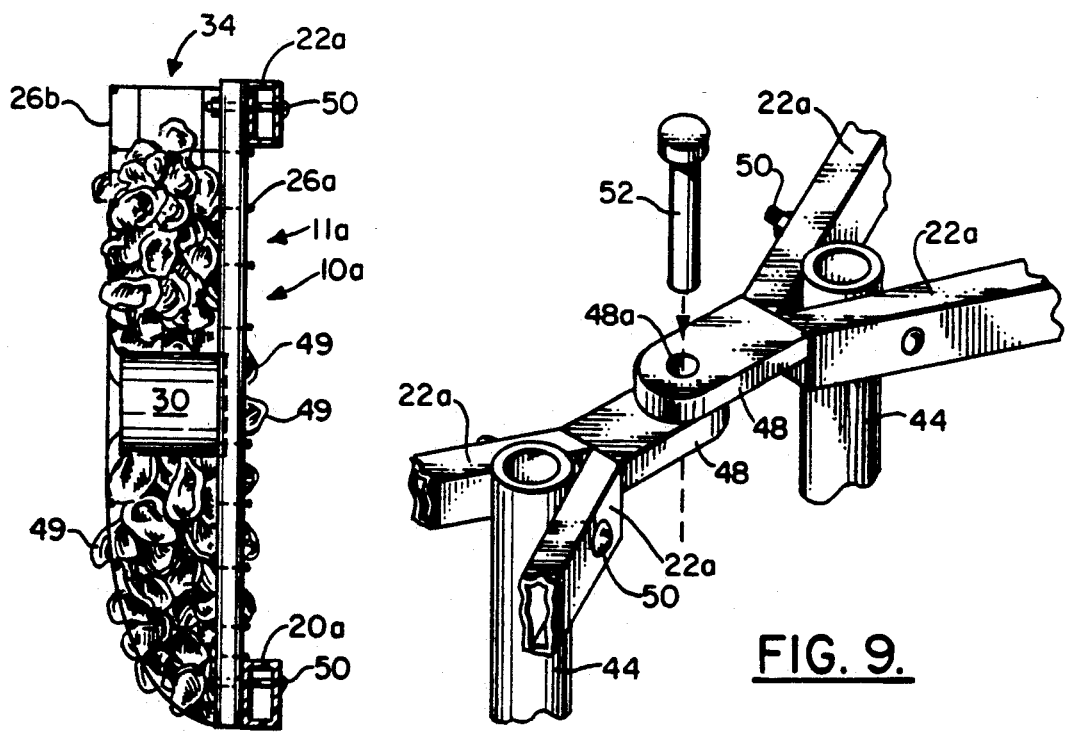

METHOD AND APPARATUS FOR GROWING OYSTER REEF

BACKGROUND OF THE INVENTION

1. Field of the Invention

The invention relates to shellfish growth, and, in particular, to methods and apparatus for fostering shellfish growth. More particularly, the present invention relates to fostering the growth of oysters and the formation and creation of oyster reefs.

2. Description of the Related Art

Projections based on historic rates of erosion indicate that the Gulf of Mexico shore in some areas of coastal Louisiana will move inland as much as 25 to 30 miles within the next 50 years. These predictions are based upon measurements of rapid erosion of the barrier islands along the coast of Louisiana, erosion and deterioration of the coastal marshes, and subsidence. The erosion problem is exacerbated by the fact that the lowland soils and near-surface sediments inland of the existing barrier islands are composed largely of clays and organic peats and are almost devoid of sand-sized particles that might be reworked into new chains of barrier islands. Muddy shorelines are highly susceptible to erosion, while shorelines composed of sand, gravel, or shell can better absorb wave energies associated with open waters.

The ways in which sand, gravel, or shell can be introduced onto Louisiana's shores and beaches include deposition in the immediate vicinity of the active outlets of the Mississippi and Atchafalaya Rivers, dredging from buried sand or shell bodies, introduction from a distant source, and production of shell (calcium carbonate) by shell fish. While Eastern American oysters and clam shells have been dredged from Louisiana water bodies for many years, their use in shoreline management has been limited. The use of shoreline and bankline stabilization has application in many coastal and estuarine areas throughout the world.

Reef construction also can be expected to benefit fisheries production and diversity. Reefs are known to both aggregate existing populations of fish and provide secondary increases in production by providing additional forage in the form of attached and associated floral and faunal communities. Studies of artificial reefs have demonstrated that fish biomass may be from eight to thirty-five times greater than nearby control areas. In inshore waters of the Gulf of Mexico, man-made oyster reefs, planted by spreading cultch on the bottom, have been used to concentrate desirable fish species. Ecological studies have listed 170 species of plants and animals commonly associated with oyster reefs in the northern Gulf of Mexico region.

U.S. Pat. No. 4,788,937 discloses oyster bed fostering by distributing chunks of rubber or rubber chips on the bottom of a body of water. The chunks of rubber or rubber chips may be produced by chopping or shredding old rubber tires into pieces ranging in dimension from one to four inches.

U.S. Pat. No. 4,377,987 discloses a system for growing oysters including, in combination with a vertical row of trays suspended from carrying ropes and enveloped by a protection net where each tray has a rim and bottom net for holding oysters, a system for releasably fastening the trays to the carrying ropes; the fastening system includes converging notches of indentations in the rim of each tray and an enlarged detent on each carrying rope for releasably engaging the notches or indentations.

U.S. Pat. No. 4,186,687 discloses a method for growing oysters and other mollusks in which cultchless young oysters of a selected size taken from seed stock are placed in a first set of foraminous cribs and the first set of foraminous cribs are then placed on a shelf within an open top receptacle where the young oysters are protectively housed within the receptacle intermediate the top and bottom of the receptacle. Immature oysters of a larger size than the oysters placed in the first set of cribs are placed in a second set of foraminous cribs and the second set of foraminous cribs are placed across the open top of the receptacle above the first set of cribs. The second set of cribs are lashed to the top of the receptacle, whereupon the receptacle with its oyster containing cribs supported thereon are lowered to the bottom of a body of water where it is allowed to remain for a predetermined oyster growth period. The receptacle and trays may be raised periodically for inspection, and for culling from the second set of cribs the mature oysters, and for culling from the first set of cribs the immature oysters above a predetermined size which are then placed in the second set of cribs where they are allowed to reach maturity. The apparatus of this invention includes the receptacle described above in subcombination and in combination with the foraminous cribs.

U.S. Pat. No. 3,811,411 discloses a method of cultivating mollusks including enclosing discrete groups of seed mollusks lengthwise of the interior of the tube of netting material, lowering the resulting tube into an aqueous mollusk growth-inducing environment, and thereafter harvesting the grown mollusks.

U.S. Pat. No. 3,702,599 discloses a shellfish growout tray which is a device for sustaining the growth of shellfish, such as oysters and the like, including a one-piece, molded plastic tray including a bottom wall and four side walls providing an open top for the efficient loading of immature shellfish into the tray, the tray having stacking rails and tray supporting surfaces enabling the loaded tray to be guidingly moved into a stable operative stacked relation with a plurality of like loaded trays wherein adjacent trays define an operative growth space therebetween, the bottom wall being operative to support immature shellfish and provided with perforations permitting efficient unitary movement of the operatively stacked trays into and out of an operative position within the water environment of growth, the side walls being perforated so that when the tray is in such operative position sufficient water flow through the operative space is provided to nourish the growing shellfish while predatory water life is excluded therefrom, the height of the side walls being such that the operative space is sufficient to permit growth of the shellfish to maturity while insuring an efficient number of operative spaces within a given stack height.

U.S. Pat. No. 3,430,607 discloses a method of growing oysters by using a particulate gypsum oyster bed covering including distributing particulate gypsum on the bottom of a body of water adapted to the growth of oysters to form a bed, the gypsum being produced by acidulating phosphate rock with sulfuric acid in the manufacture of phosphate products.

U.S. Pat. No. 3,316,881 discloses an artificial oyster cultch including vertically spaced superimposed sheets, the sheets being suitable to set spat and having raised central portions and lower edge portions and alternately positioned crisscrossed members, and a connecting device for holding the sheets together in crisscrossed stacked relation.

SUMMARY OF THE INVENTION

In accordance with the present invention there is provided a method and apparatus for forming an oyster reef, the method including setting seed oysters on cultch material, placing the cultch material containing the seed oysters in water permeable panels to form a vertical permeable wall of cultch material through which water may flow, and placing the panels in water having favorable conditions for oyster growth. The apparatus includes water permeable panels for holding cultch material in a vertical permeable wall to expose the entire column or wall of cultch to water having favorable conditions for oyster growth, and blocks formed from the panels.

One advantage of the method and apparatus of the present invention is that the oysters contained in the vertical panels have greater exposure to tidal currents than oysters lying on the bottom of lakes and bays, and therefore the oysters in the panels can obtain more food and grow quickly to form oyster reefs faster than natural oyster reef growth.

Furthermore, the cultch containing panels of the invention simplify seed oyster handling and hold the oysters in place during their growth.

In addition, the panels of the invention protect the seed oysters from certain predators such as crabs, drumfish, and the like during the early stages of growth of the seed oysters when the shells are thin and fragile.

Another advantage of the panels of the invention is that the oysters grow through the panels to form clusters and form a cemented reef mass.

The panels of the invention can be used in geometric configurations for coastal engineering applications to reduce wave energy along shores and banks by acting as a breakwater, to create and enhance fisheries habitat, and to contain dredge material.

The vertical panels of the present invention provide habitat opportunities for reef organisms and resulting forage benefits to fish on each face of the panel. The vertical configuration and the arrangement of the panels into geometric forms also provide shelter to fish.

The present invention enables reefs to be established where they may not be established through natural processes, and reduces the time for reef formation from hundreds or thousands of years to a few years or decades.

Furthermore, the present invention produces coarse, natural particles into the coastal estuarine ecosystem which stabilize bottoms and form beaches utilizing natural materials and processes.

The panels of the invention can be placed in position for oyster growth by shallow draft boats and barges in a few feet of water without dredging or environmental damage or disturbance of water bottoms, and the invention is compatible with oyster growing areas where oysters are grown for human consumption.

BRIEF DESCRIPTION OF THE DRAWINGS

FIG. 1 is an elevational view of a reef panel of the invention;

FIG. 2 is a cross-sectional view taken along lines 2—2 of FIG. 1;

FIG. 3 is a cross-sectional view taken along lines 3—3 of FIG. 1;

FIG. 4 is a perspective view of a fish portal located in the reef panel of the invention;

FIG. 7 is a perspective view of a portion of the reef block of the invention;

FIG. 8 is a side elevational view of a reef panel having cultch material therein;

FIG. 9 is a perspective view of the connecting device for connecting two reef blocks;

BRIEF DESCRIPTION OF THE PREFERRED EMBODIMENTS

Figure 5:
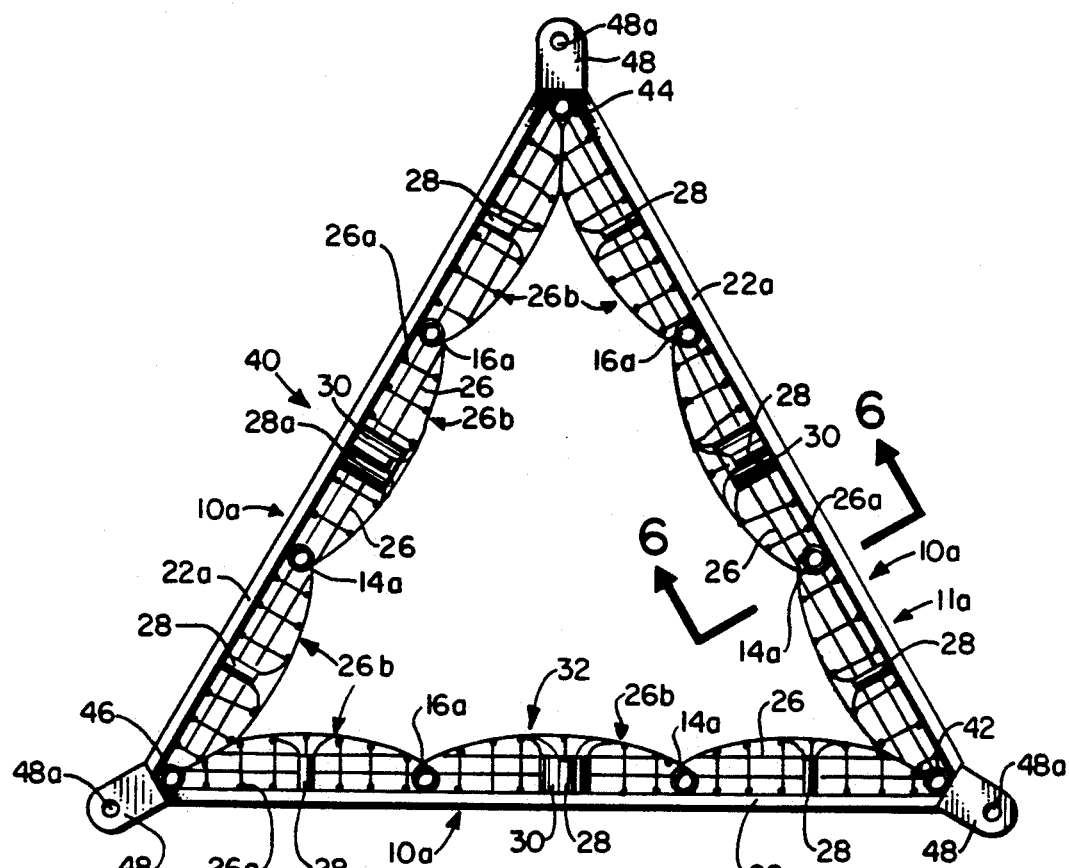
FIG. 5 is a top view of a reef block of the invention.
Figure 6:
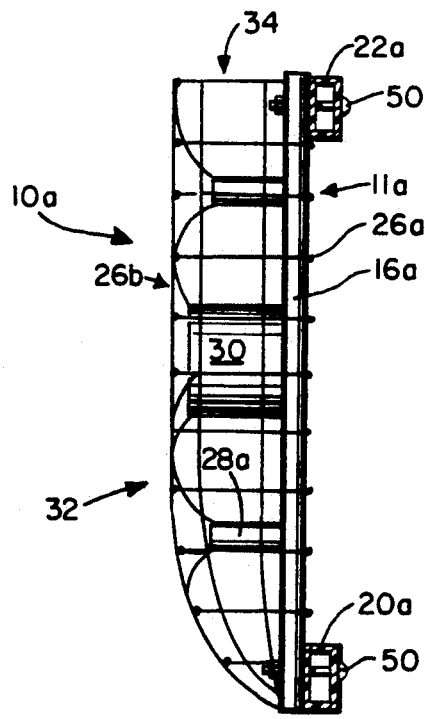
FIG. 6 is a cross-sectional view taken along lines 6—6 of FIG. 1.

Referring now to the drawings, in FIG. 1 is shown a reef panel of the invention generally indicated by the numeral 10 which is adapted to hold cultch material to which mollusks such as oyster will attach and grow. Reef panel 10 has a frame generally indicated by the numeral 11 which includes four vertical support members 12, 14, 16, and 18. Frame 11 also includes a bottom horizontal support member 20 is connected to each of the vertical support members 12, 14, 16, and 18, and two top horizontal support members 22 and 24. Vertical support members 12 and 14 are connected to top horizontal support member 22, and vertical support members 16 and 18 are connected to top horizontal support member 24. Top horizontal support members 22 and 24 are shown overlapped in FIG. 1 to form a lap joint, although other joints such as butt joints or the like may be utilized. Top horizontal support members may be combined into one integrally formed horizontal support member if desired.

Figure 15:
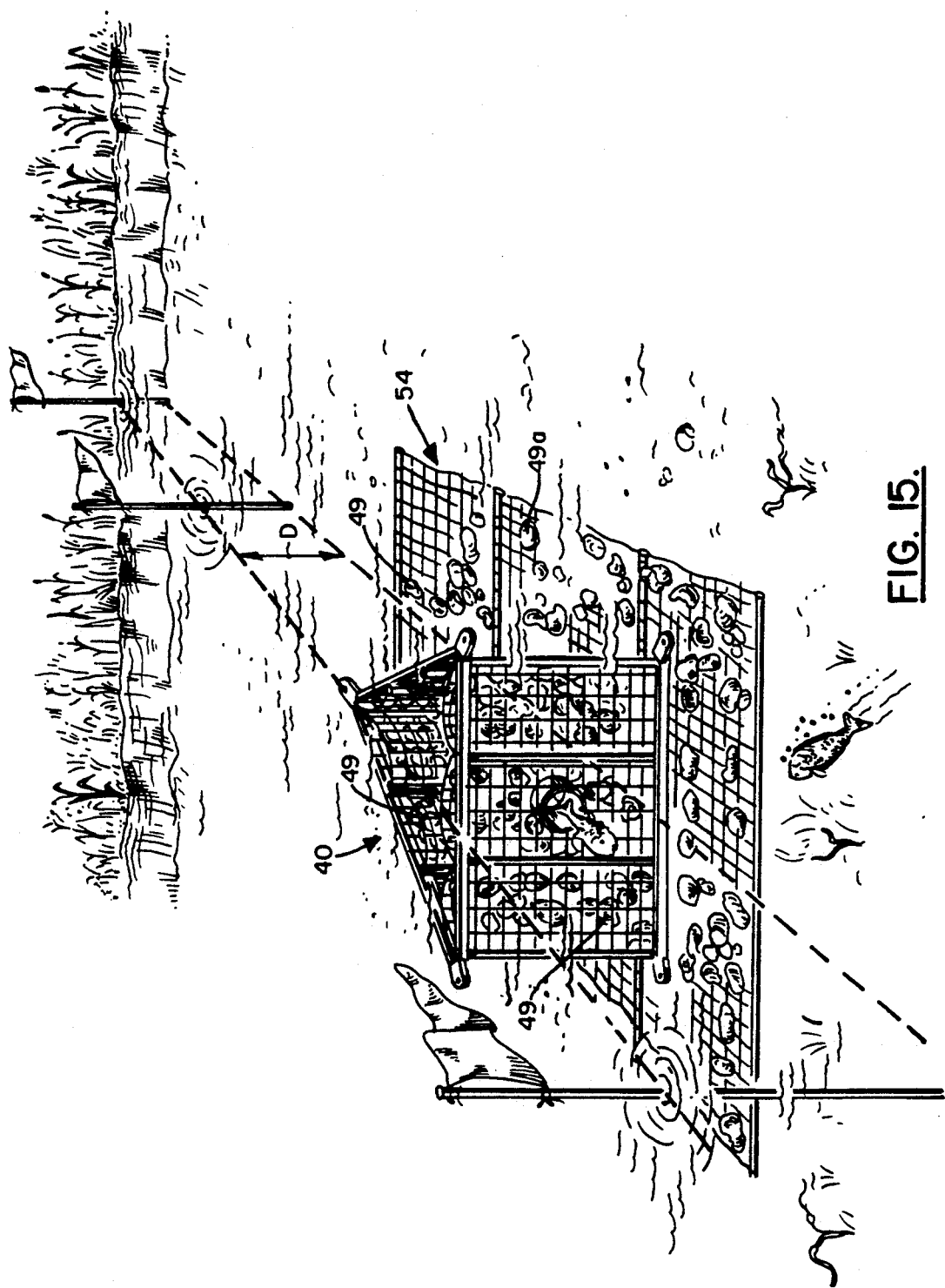
FIG. 15 is a perspective view of a reef block of the invention located in a bay or lake.

Preferably bottom horizontal support member 20 is about five feet in length, although the length of bottom horizontal support member 20 may range from about twenty inches to about ten feet. Preferably vertical support members 12, 14, 16, and 18 are about three feet in length and thus the vertical height of reef panel 10 is about three feet, although the length of vertical support members 12, 14, 16, and 18 may range from about two feet to about six feet. In FIG. 15 the vertical height of reef panel 10 is indicated by the letter "D".

The support members 12, 14, 16, 18, 20, 22, and 24 may be constructed from a variety of materials including, but not limited to, wood, plastic pipe, metal pipe, solid metal rods such as concrete reinforcing rods, and the like. Solid metal rods such as concrete reinforcing rods are preferred. The support members 12, 14, 16, 18, 20, 22, and 24 may be connected together in any manner well known in the art such as nailing, gluing, welding, bolting, screwing, tying and the like. When solid metal rods such as concrete reinforcing rods are utilized, the support members 12, 14, 16, 18, 20, 22, and 24 are preferably connected by welding, and horizontal members 22 and 24 are welded at lap joint 25.

Connected to frame 11 is wire mesh or net 26. Wire mesh 26 completely covers frame 11 to form frame wall 26a and is folded back adjacent to frame 11 as shown in FIGS. 2 and 3 and connected to spacers 28 and preferably hollow cylindrical fish portal 30 to form a back wall 26b. Frame wall 26a and back wall 26b form cage 32 for holding cultch material. Cage 32 has a top opening 34 into which cultch material may poured. If desired a fiber net such as a cotton or plastic net could be substituted for wire mesh 26, although wire mesh 26 is preferred.

Fish portal 30 permits fish to swim through reef panel 10 since no clutch material is placed therein. Fish portal 30 could be omitted from reef panel 10 if desired, and the wire mesh 26 could be held away from frame 11 solely by spacers 28. If desired, the wire mesh 26 may cover both ends of fish portal 30 to allow only smaller "bait fish" to pass through the portal. Fish portal 30 has the additional advantage of allowing water to circulate into the interior of the reef when the panels are configured as blocks.

Preferably spacers 28 are plastic pipe about ⅜ inch in diameter and about two inches in length. Preferably fish portal 30 is about eight inches in diameter and about three inches in length. Thus, most preferably the cage 32 and the panel 10 has a thickness, which is the distance between wall 26a and wall 26b, of less than about one-tenth the height of frame 11. The thickness of cage 32 and panel 10 may range from about two inches to about one foot, and the height of frame 11 may range from about two feet to about six feet.

Preferably spacers 28, and fish portal 30 as shown in FIG. 4, are connected to wire mesh 26 by forming holes 36 in the ends of spacers 28 and fish portal 30, inserting tie wires 38 through holes 36, and tying tie wires 38 securely around wire mesh 26.

Wire mesh 26 preferably has rectangular shaped mesh having a mesh size sufficiently small to retain the selected cultch material placed in the cage formed by wire mesh 26 on reef panel 10. Clutch material is preferably old oyster shell, although particulate limestone, and other cultch materials known in the art may be utilized.

In FIGS. 5-8 is shown a preferred reef block generally indicated by the numeral 40 constructed from three reef panels generally indicated by the numeral 10a. Reef panels 10a are virtually identical to reef panels 10, except that the vertical support members 14a, 16a, and 42, 44, and 46 of frame 11a of reef panels 10a are preferably made from plastic pipe such as polyvinyl chloride pipe or aluminum pipe rather than metal rods such as concrete reinforcing rods or metal pipe to minimize the total weight of reef block 40. Furthermore, top horizontal members 22 and 24 are replaced with a single top horizontal member 22a shown in FIG. 5 which is preferably made from aluminum and has a rectangular cross-section as shown in FIGS. 7 and 9, and bottom support member 20a is preferably made from aluminum or other light-weight metal and has a rectangular cross-section as shown in FIGS. 7 and 9. Adjacent top members 22a terminate in flange 48 which has bolt receiving hole 48a therein. The other elements of panel 10a which are identical to panel 10 are numbered identically. FIG. 8 shows a reef panel 10a having cultch material 49 therein.

As can be seen in FIGS. 5-9, vertical support members 14a, 16a, 42, 44, and 46 are connected to top horizontal members 22a and bottom horizontal members 20a by bolts 50.

When reef blocks are constructed from panels, as shown in FIGS. 1 and 2, the panels may be joined by connecting vertical support member 12 of one panel to vertical support member 18 of an adjacent channel with "U" bolts, clamps, wire, cable, or other connecting devices.

One reef block 40 can be attached to another reef block 40 as shown in FIG. 9 by aligning the bolt receiving hole 48a of one flange 48a with the bolt receiving hole 48a of an adjacent reef block 40 and placing a pin 52 therein. Reef blocks 40 can also be joined together by connecting vertical support member 44 of one block to vertical support member 44 of another block, or the corner formed by vertical support members 12 and 18 of another block, with "U" bolts, clamps, ties, or any other manner well known in the art.

Figure 10:
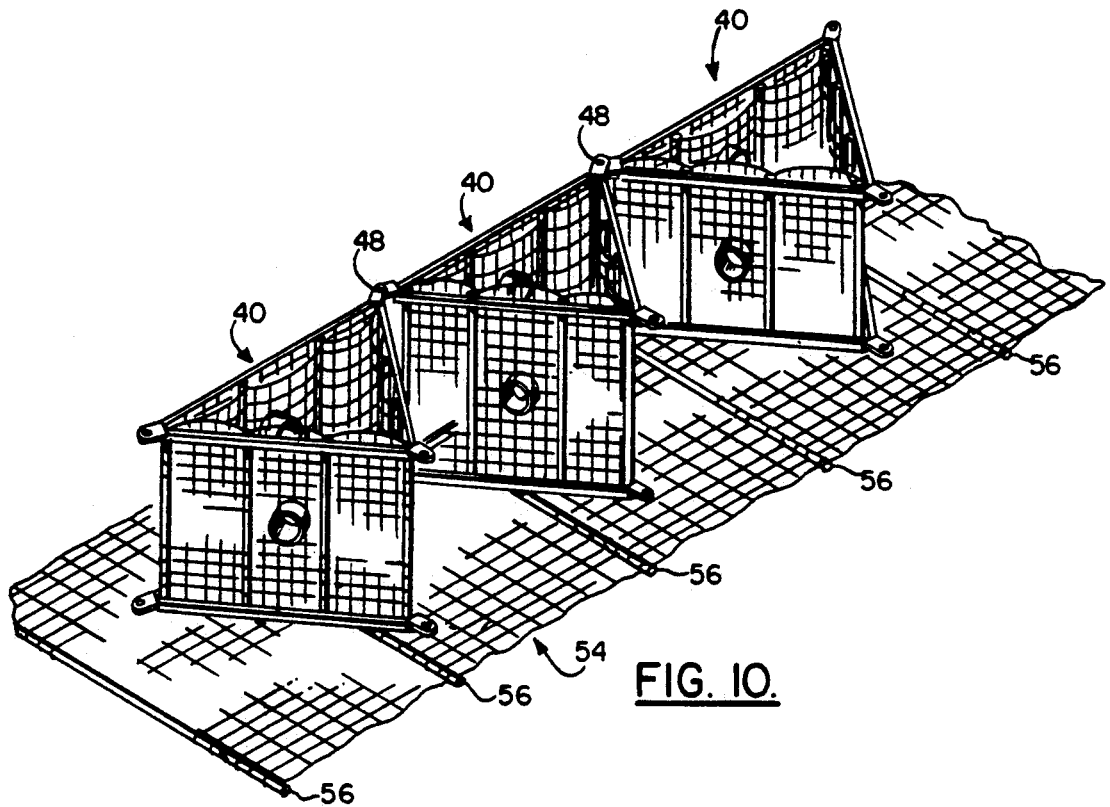
FIG. 10 is a perspective view of three reef blocks connected together to form a breakwater and located on a pad to prevent sinking into the lake or bay bottom.

In FIG. 10 is shown three reef blocks 40 connected together at flanges 48 and resting on a mat or net generally indicated by the numeral 54. Net 54 is placed on the bottom of the body of water in which the reef blocks 40 are placed to prevent reef blocks 40 from sinking into the water bottom if the water bottom is a soft material such as mud. Net 54 may have rods 56 attached thereto to hold the edges of net 54 in place and to hold the net 54 in place prior to placing reef blocks 40 thereon. Mats or nets suitable for use as net 54 are known in the art.

Figure 11:
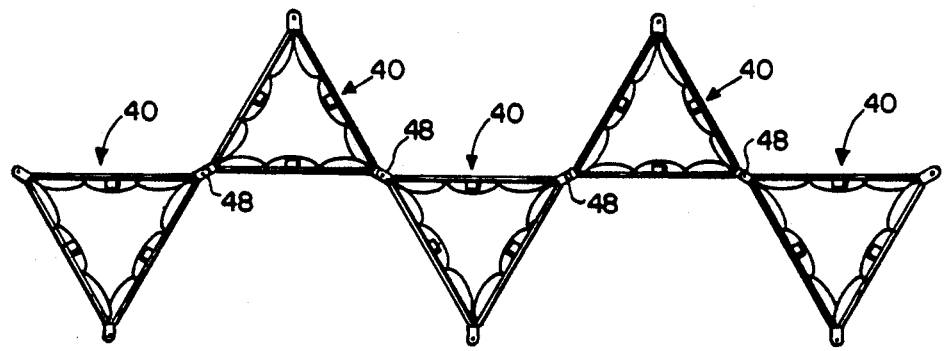
FIG. 11 is a top view of a second embodiment of a breakwater employing the blocks and reef panels of the invention.

In FIG. 11 is shown a top view of an alternate pattern or reef configuration which can be made by attaching five reef blocks 40 together at flanges 48 and placing them on a water bottom.

Figure 12:
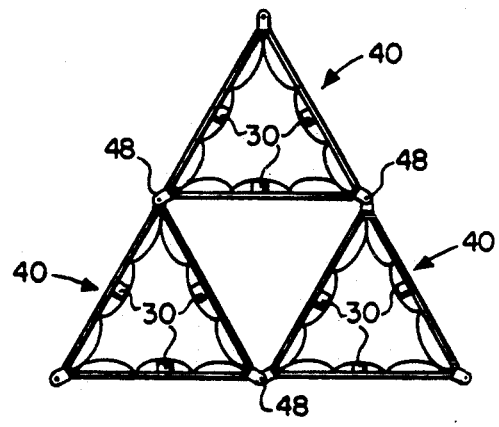
FIG. 12 is a top view of a third embodiment of a breakwater employing the blocks and reef panels of the invention.

In FIG. 12 is shown a top view of an alternate pattern or reef configuration which can be made by attaching three reef blocks 40 together at flanges 48 and placing them on a water bottom.

Figure 13:
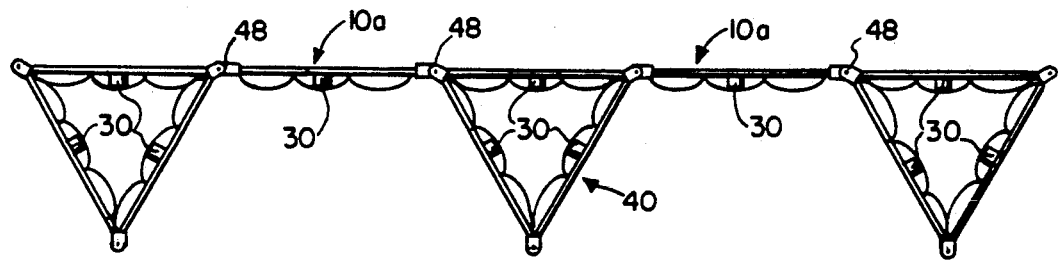
FIG. 13 is a top view of a fourth embodiment of a breakwater employing the blocks and reef panels of the invention.

In FIG. 13 is shown a top view of an alternate pattern or reef configuration which can be made by attaching three reef blocks 40 to panels 10a at flanges 48 and placing them on a water bottom.

Figure 14:
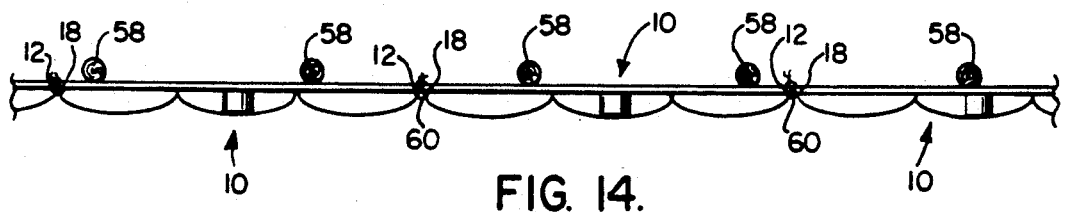
FIG. 14 is a top view of a fifth embodiment of a breakwater employing the reef panels of the invention.

In FIG. 14 is shown a top view of an alternate pattern or reef configuration which can be made by attaching three reef panels 10 to posts 58 which extend vertically upward from a water bottom. Panels 10 are connected together by tying adjacent vertical support members 18 and 12 together with "U" bolts, clamps, wire or rope 60.

In FIG. 15 is shown a reef block 40 located in a bay or pond on a net or mat 54. As the oysters mature, some oysters will fall onto the water bottom as indicated at 49a.

To build a reef in accordance with the invention, seed oysters are set on clutch material which preferably is old oyster shell. The seed oysters may be obtained from seed grounds, cultivated oyster grounds, or naturally occurring sources and loaded into panels 10 or 10a, or most preferably, produced by controlled or remote setting of hatchery produced oyster larvae.

If the controlled or remote setting technique is used, cleaned cultch material 49 is placed in the wire cages 32 of the reef panels 10 or 10a. The panels 10 or 10a are placed in tanks filled with sea water and the hatchery produced oyster larvae is released into the tanks. After a short period of time, usually 24 to 48 hours, the larvae become attached to the cultch 49 and begin the process of forming shells. Once the oyster spat have been set through this procedure, the reef panels 10 or 10a can be removed and either placed in shallow water nursery area or used directly for building structures. Thus, the reef panels 10 or 10a, which are of uniform configuration, provide an efficient way for producing and handling the seed oysters.

Cultch material with seed oysters 49 obtained from seed grounds, cultivated oyster grounds or other sources may be placed directly into the wire cages 32 at the source of the seed oysters for ease in handling or at the reef site.

Cultch material 49 without seed oysters may also be placed in, or attached to, panels 10 and 10a, in addition to the seeded cultch 49 having spat thereon. Free swimming larvae in the area where the panels 10 and 10a are located will become attached to the cultch to form spat. The oyster larvae may be produced by naturally occurring oysters where the water bodies where the panels 10 or 10a are placed or from oysters in the cages as they mature. The cultch material 49 placed in the panels 10 and 10a provides surfaces to which oysters become attached and thus enhance the growth of the reef.

Reef panels 10 and 10a increase rapidly in volume and weight. Experiments in coastal Louisiana indicate that the seed oysters grow about one centimeter per month. When old oyster shell is used for cultch 49, about 24 or more seed oyster may grow on a single oyster valve.

On the average, six seed oysters survive on each single valve of cultch shell 49. Upon maturity, each seed oyster will produce two valves. Thus, after approximately one year of growth there will be an average of thirteen shell valves for each single shell with seed oysters originally placed in the reef panel.

Approximately 300 pounds dry weight of cultch 49 are required to fill each reef block 40. Experiments in coastal Louisiana indicate that 300 pounds of cultch oyster shell set with small seed oysters will weigh approximately two tons after one year of growth.

Although oysters are the preferred mollusks for forming reefs in accordance with the present invention, other mollusks could be utilized, including clams or the like. Preferred configuration of reef blocks are shown as columnar triangles. However, other geometric forms such as square and rectangular blocks may be constructed from the panels.

Although the preferred embodiments of the invention have been described in detail above, it should be understood that the invention is in no sense limited thereby, and its scope is to be determined by that of the following claims:

What is claimed is:

1. A method for forming an oyster reef comprising:
    a. placing cultch material in panel means for forming a vertical, permeable wall of clutch material through which water may flow, said panel means including:
        i. a rectangular frame means for supporting said cultch material,
        ii. support means for supporting said frame means in a vertical position, and
        iii. cage means attached to said frame means for holding said cultch material, said cage means covering substantially the entire frame means, said cage means having two generally rectangular parallel walls, the first of said two walls being connected to said frame means, and the second of said two walls being spaced apart from said first wall a distance less than about one-sixth of the vertical height of said frame.
    b. setting seed oysters on said cultch material; and
    c. placing said panel means in a body of water which supports oyster growth.

2. The method of claim 1 wherein seed oysters are set on said cultch material by placing said panel means in a tank filled with water containing hatchery produced oyster larvae for a time sufficient to set oysters on said cultch material.

3. The method of claim 1 wherein seed oysters are set on said cultch material after said cultch material is placed in said water.

4. A panel for fostering the growth of oysters comprising a water permeable panel for holding cultch material, said panel comprising:
    a. a generally rectangular frame means for supporting said cultch material,
    b. support means for supporting said frame means in a vertical position, and
    c. cage means attached to said frame means for holding said cultch material, said cage means covering substantially the entire frame means, said cage means having two generally rectangular parallel walls, the first of said two walls being connected to said frame means, and the second of said two walls being spaced apart from said first wall, said cage means having fish portal means therein for permitting fish to travel through said panel means.

5. The panel of claim 4 wherein said second of said two walls is spaced apart from said first wall a distance of from about two inches to about one foot.

6. The panel of claim 4 wherein the vertical height of said frame means is from about two feet to about six feet.

7. The panel of claim 4 wherein the horizontal length of said frame means is from about two to about six feet.

8. The panel of claim 4 wherein said cage means is made from wire mesh.

9. The panel of claim 4 wherein said frame means has connecting means attached thereto for connecting two of said panels together.

10. The panel of claim 4 wherein said support means comprises one or more of said panel means.

11. The panel of claim 4 wherein said support means comprises a second panel connected to said first panel and a third panel connected to said first panel, said second and said third panel being connected to each other to form a triangular block.

12. The panel of claim 11 wherein a plurality of said triangular blocks are connected together to form a reef.

13. The panel of claim 11 wherein said triangular block is placed on a net means located on a water bottom.

14. A method for providing geometric configurations of living reef for coastal engineering and environmental enhancement applications comprising:
    a. constructing a plurality of generally rectangular panel means for supporting cultch material having support means for supporting said panel means in a vertical position, and cage means attached to said frame means for holding said cultch material, said cage means covering substantially said entire panel means, said cage means having two generally rectangular parallel walls, the first of said two walls being connected to said panel means, and the second of said two walls being spaced apart from said first wall, b. placing cultch material in said panel means for forming a vertical, permeable wall of cultch material through which water may flow;
c. setting seed oysters on said cultch material; and
d. placing said panel means in a body of water which supports oyster growth.

15. The method of claim 14 wherein seed oysters are set on said cultch material by placing said panel means in a tank filled with water containing hatchery produced oyster larvae for a time sufficient to set oysters on said cultch material.

16. The method of claim 15 wherein said support means comprises a second panel connected to said first panel and a third panel connected to said first panel, said second and said third panel being connected to each other to form a triangular block.

17. The method of claim 16 wherein a plurality of said triangular blocks are connected together to form a reef.

* * * * *